E. R. SHNABLE.
ROPE FITTING.
APPLICATION FILED MAR. 9, 1910.
1,073,292.
Patented Sept. 16, 1913.
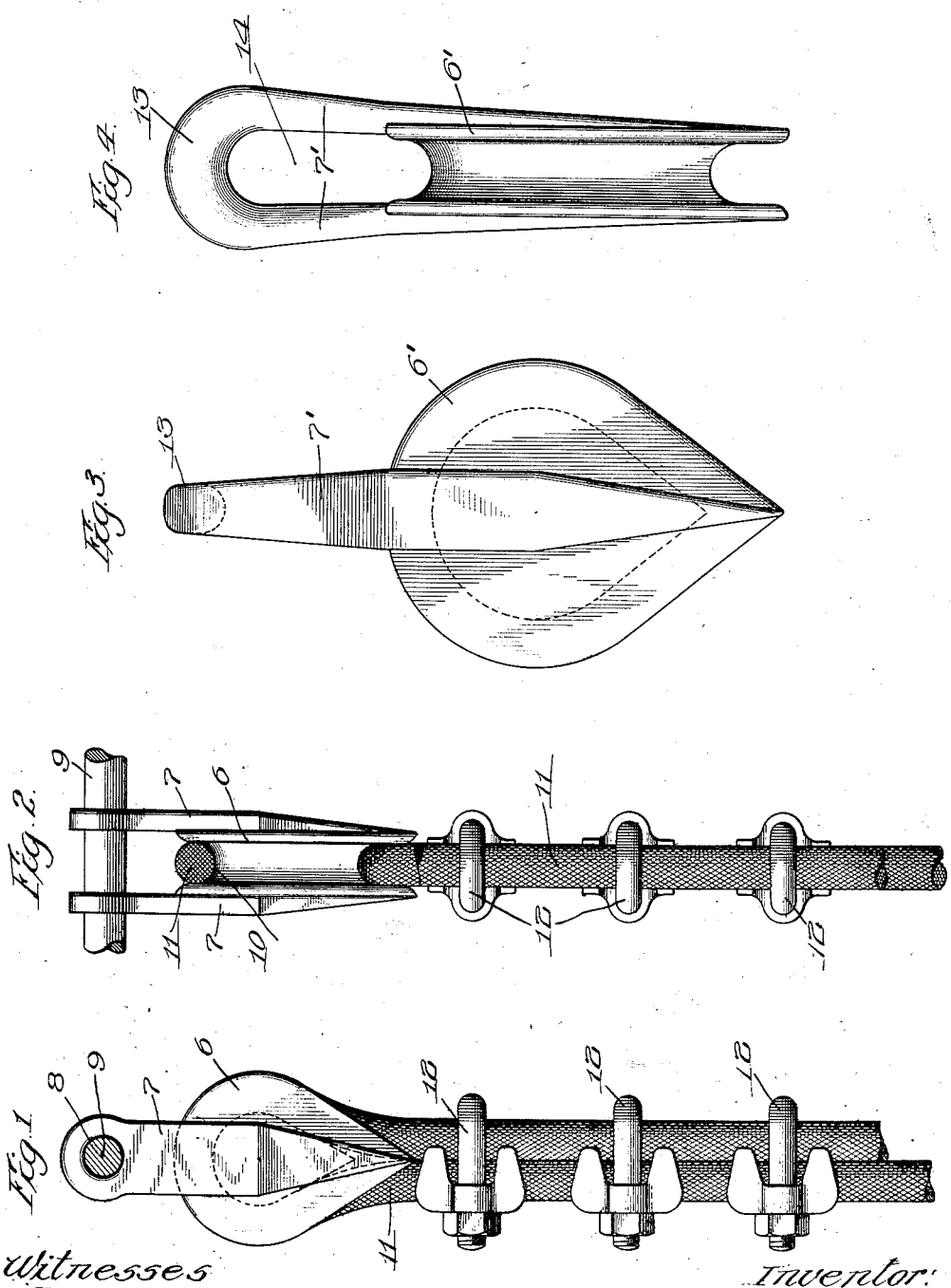

UNITED STATES PATENT OFFICE.

EMILE R. SHNABLE, OF CHICAGO, ILLINOIS, ASSIGNOR TO SHNABLE & QUINN, OF CHICAGO, ILLINOIS, A COPARTNERSHIP COMPOSED OF EMILE R. SHNABLE AND JOHN B. QUINN.

ROPE-FITTING.

1,073,292.  Specification of Letters Patent.  Patented Sept. 16, 1913.

Application filed March 9, 1910. Serial No. 548,296.

*To all whom it may concern:*

Be it known that I, EMILE R. SHNABLE, a citizen of the United States, and a resident of Chicago, in the county of Cook and State of Illinois, have invented certain new and useful Improvements in Rope-Fittings, of which the following is a specification.

My invention relates to rope fittings and has special reference to a fitting consisting of a combined thimble and shackle for the purposes hereafter specified.

I am aware that it is well known in the art to use a thimble either oval or round which is suitably fastened near the end of a rope, the rope being so disposed that it incloses the thimble. This thimble is ordinarily made hollow so that a hook or other suitable device may be inserted in the central portion. I am also aware that shackles are well known, these shackles often being constructed with a socket in which the end of a rope is adapted to be secured.

One of the objections to the present form of shackle which has a socket, is that considerable labor is involved in fastening the rope in its proper position and at the same time the strength of the connection is much inferior to that which is obtained with a thimble. On the other hand when a thimble is employed, the special advantages of a shackle, which consist in the case of an open shackle, of the use of a readily removable pin and in a closed shackle of the use of a strong narrow loop to which connection is readily made, are lost.

One of the objects of my invention consists in providing a rope fitting which has all of the advantages of a thimble and at the same time, all of the advantages of a shackle. This result is accomplished by fastening the shackle to the sides of the thimble member.

The various advantages of my invention will be more readily understood by reference to the accompanying drawings which show a preferred form of my invention.

Figure 1 is a side elevation of my improved fitting showing the rope in position. Fig. 2 is an end elevation of the parts shown in Fig. 1. Fig. 3 is a side elevation of a modification of my improved fitting. Fig. 4 is an end elevation of the parts shown in Fig. 3.

Referring to Figs. 1 and 2, 6 is the thimble portion of my fitting which is preferably made solid with no opening in the central portion, although such opening may be provided if it is desired to produce a lighter fitting. On the two sides of the thimble portion 6 are provided the shackle or supporting members 7, 7, which are preferably cast integral with the thimble portion 6. The shackle members 7, 7 project beyond the thimble portion 6 and each shackle member is provided near its end with an opening 8 through which the pin 9 may be readily inserted. The thimble member 6 is provided on its periphery with a groove 10 which is engaged by the wire rope or cable 11, this cable being retained in position by means of the clips 12, 12, 12.

Figs. 3 and 4 illustrate a modification of my invention in which a closed shackle instead of an open shackle is employed. The two shackle members 7', 7' are made continuous with each other, being joined at their outer ends by the transverse portion 13, thus forming the opening 14 between the thimble portion 6' and the shackle members 7', 7'.

Although my invention may be used for many purposes, it is particularly adapted for use in connection with dredging buckets, a suitable portion of the bucket being attached to the shackle members of the fitting either by means of the pin 9, or by means of a hook which is inserted in the opening 14 in the case of the modification shown in Figs. 3 and 4.

It is evident that many changes can be made in the exact construction of the device which I have described without departing from the spirit of my invention.

What I claim as new is:

1. A rope fitting comprising a spatulate thimble having a continuous groove, and a shackle integral with the sides of said thimble, the legs of said shackle outstanding from the respective sides of said thimble, said legs having a tapering form and extending substantially across the respective faces of said thimble, substantially as described.

2. A rope fitting comprising a spatulate thimble having a continuous groove, and a shackle integral with the sides of said thimble, the legs of said shackle outstanding from the respective sides of said thimble, said legs having a tapering form and extending substantially across the respective faces of said thimble, the free ends of said legs having alined apertures, substantially as described.

3. A rope fitting comprising a spatulate thimble having a continuous groove, and a shackle integral with the sides of said thimble, the legs of said shackle outstanding from the respective sides of said thimble, said legs having a tapering form and extending substantially across the respective faces of said thimble, the free ends of said legs having alined apertures, and a pin in said apertures, substantially as described.

EMILE R. SHNABLE.

Witnesses:
HENRY M. HUXLEY,
M. ROBERTSON.